US011890239B2

(12) United States Patent
Kato

(10) Patent No.: US 11,890,239 B2
(45) Date of Patent: Feb. 6, 2024

(54) VEHICLE

(71) Applicant: TOYOTA JIDOSHA KABUSHIKI KAISHA, Aichi-ken (JP)

(72) Inventor: Makoto Kato, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 399 days.

(21) Appl. No.: 17/349,920

(22) Filed: Jun. 17, 2021

(65) Prior Publication Data
US 2021/0393456 A1 Dec. 23, 2021

(30) Foreign Application Priority Data
Jun. 23, 2020 (JP) .................... 2020-108206

(51) Int. Cl.
B60N 3/00 (2006.01)
A61G 3/08 (2006.01)
B60N 2/24 (2006.01)

(52) U.S. Cl.
CPC ........... *A61G 3/0808* (2013.01); *B60N 2/245* (2013.01)

(58) Field of Classification Search
CPC .... B60N 3/00; B60N 2/245; B60N 2002/442; A61G 3/08; A61G 3/0808

USPC .............. 296/65.04, 68.1; 414/921
See application file for complete search history.

(56) References Cited

U.S. PATENT DOCUMENTS

2006/0093452 A1  5/2006  Sakano et al.
2014/0285146 A1  9/2014  Huston et al.

FOREIGN PATENT DOCUMENTS

| CN | 1765344 A | | 5/2006 |
|----|-----------|---|--------|
| JP | S62665 Y2 | * | 1/1987 |
| JP | H0349696 Y2 | * | 10/1991 |
| JP | H0577670 A | * | 3/1993 |
| JP | 2004261492 A | * | 9/2004 |

* cited by examiner

*Primary Examiner* — Dennis H Pedder
(74) *Attorney, Agent, or Firm* — HAUPTMAN HAM, LLP

(57) ABSTRACT

A vehicle, including: a panel member provided at a vehicle body, the panel member opposing a wheelchair, which has boarded the vehicle, in a vehicle width direction; a front side securing member provided at the panel member, the front side securing member being caused to contact a front portion side of a handrim of the wheelchair or a front portion side of a wheel of the wheelchair; and a rear side securing member that presses a rear portion side of the handrim or a rear portion side of the wheel toward a vehicle body front side so as to push the front portion side of the handrim or the front portion side of the wheel against the front side securing member.

9 Claims, 6 Drawing Sheets

VEHICLE

CROSS-REFERENCE TO RELATED APPLICATION

This application is based on and claims priority under 35 USC 119 from Japanese Patent Application No. 2020-108206 filed on Jun. 23, 2020, the disclosure of which is incorporated by reference herein.

BACKGROUND

Technical Field

The present disclosure relates to a vehicle that can be boarded and exited in a wheelchair.

Related Art

A vehicle that an occupant of a wheelchair can board in the wheelchair and drive in the wheelchair has been known since heretofore (for example, see U.S. Patent Application Publication No. 2014/0285146).

When an occupant of a wheelchair is on board this vehicle, the wheels of the wheelchair are locked by a brake provided at the wheelchair, and the occupant of the wheelchair is restrained in the vehicle by a seatbelt provided in the vehicle.

However, the brake provided at the wheelchair and the seatbelt provided in the vehicle are not a structure that secures the wheelchair itself relative to the vehicle. Therefore, when the vehicle accelerates, decelerates or the like, the possibility of the wheelchair moving relative to the vehicle due to inertial force cannot be eliminated. When the wheelchair moves relative to the vehicle, it may be difficult to assure safety of the occupant of the wheelchair.

SUMMARY

Accordingly, an object of the present disclosure is to provide a vehicle that may assure safety of an occupant of a wheelchair.

In order to achieve the object described above, a vehicle according to a first aspect of the present disclosure includes: a panel member provided at a vehicle body, the panel member opposing a wheelchair, which has boarded the vehicle, in a vehicle width direction; a front side securing member provided at the panel member, the front side securing member being caused to contact a front portion side of a handrim of the wheelchair or a front portion side of a wheel of the wheelchair; and a rear side securing member that presses a rear portion side of the handrim or a rear portion side of the wheel toward a vehicle body front side so as to push the front portion side of the handrim or the front portion side of the wheel against the front side securing member.

According to the first aspect of the present disclosure, the front side securing member and the rear side securing member sandwich in the vehicle front-and-rear direction and secure a front portion side and rear portion side of a handrim or wheel of a wheelchair. Therefore, when the vehicle accelerates, decelerates or the like, movement of the wheelchair itself relative to the vehicle due to inertial force may be suppressed. As a result, safety of an occupant of the wheelchair is assured.

In a vehicle according to a second aspect of the present disclosure, in the vehicle according to the first aspect, a rail member that extends in a vehicle body front-rear direction is provided at the panel member, and the front side securing member is movably supported at the rail member.

According to the second aspect of the present disclosure, the rail member that extends in the vehicle front-and-rear direction is provided at the panel member. Thus, stiffness of the panel member is improved and the panel member may withstand a side collision of the vehicle. That is, at the time of a side collision of the vehicle, safety of an occupant of the wheelchair is assured. Moreover, because the front side securing member is supported by the rail member to be movable, a position of the front side securing member may be altered, and the wheelchair can be positioned at a suitable position according to an outer diameter of the handrim or wheel of the wheelchair.

In a vehicle according to a third aspect of the present disclosure, in the vehicle according to the second aspect, the front side securing member is structured to be movable by a manual operation by an occupant of the wheelchair.

According to the third aspect of the present disclosure, the front side securing member can be moved by a manual operation by the occupant of the wheelchair. Therefore, the front side securing member may be moved expeditiously by a simple structure.

In a vehicle according to a fourth aspect of the present disclosure, in the vehicle according to the second aspect or third aspect, the rail member includes an upper and lower pair of rail members, and in a view seen in the vehicle body front-rear direction, the front side securing member comprises a set of two front side securing members respectively provided at an upper side and a lower side relative to a center of the handrim or a center of the wheel.

According to the fourth aspect of the present disclosure, the rail members are provided as an upper and lower pair. Therefore, stiffness of the panel member is improved more effectively, and the panel member may more effectively withstand a side collision of the vehicle. Moreover, the front side securing members are provided as a set of two at the upper and lower sides of the center of the handrim or the center of the wheel, as seen in the vehicle front-and-rear direction. Therefore, the front portion side of the handrim or wheel of the wheelchair is secured more effectively.

In a vehicle according to a fifth aspect of the present disclosure, in the vehicle according to the fourth aspect, seen in the vehicle body front-rear direction, the rear side fixing member is provided between the set of the two front side securing members.

According to the fifth aspect of the present disclosure, the rear side securing member is provided, as seen in the vehicle front-and-rear direction, between the front side securing members that are provided as a set of two. Thus, seen in the vehicle width direction, the handrim or wheel of the wheelchair is sandwiched and secured by the vertices of a substantial isosceles triangle whose altitude direction is in the vehicle front-and-rear direction. Therefore, the wheelchair may be more effectively and stably secured, and when the vehicle accelerates, decelerates or the like, movement of the wheelchair itself relative to the vehicle due to inertial force is more effectively suppressed or prevented.

In a vehicle according to a sixth aspect of the present disclosure, in the vehicle according to any one of the first to fifth aspects, the rear side securing member is structured as a mechanical structure that may be caused to press the rear portion side of the handrim or rear portion side of the wheel toward the vehicle body front side by a manual operation by an occupant of the wheelchair.

According to the sixth aspect of the present disclosure, the rear side securing member is structured by the mechanical structure. Pressing of the rear portion side of the handrim or wheel toward the vehicle body front side by the mechanical structure is enabled by a manual operation by an occupant of the wheelchair. Therefore, fabrication costs of the rear side securing member may be reduced compared to a structure that is moved by an electric mechanism.

In a vehicle according to a seventh aspect of the present disclosure, in the vehicle according to any one of the first to sixth aspects, the panel member includes a pair of panel members respectively disposed at a left side and a right side, and the front side securing member and the rear side securing member are provided so as to correspond to the handrim at each of the left side and the right side or the wheel at each of the left side and the right side.

According to the seventh aspect of the present disclosure, the panel members are arranged as a pair at left and right, and the front side securing members and rear side securing members are respectively provided at the left and right handrims or wheels. Therefore, the panel members may withstand a side collision of the vehicle more effectively, and the wheelchair is more stably secured.

In a vehicle according to an eighth aspect of the present disclosure, the vehicle according to any one of the first to seventh aspects further includes a retractable slope member at the lower side of a rear portion of a floor panel, the slope member enabling the wheelchair to board the vehicle when a back door is open.

According to the eighth aspect of the present disclosure, the retractable slope member is provided at the lower side of the rear portion of the floor panel. Therefore, an occupant of a wheelchair may board the vehicle expeditiously from the vehicle body rear side of the vehicle by using the slope member, and may move into a driving position without changing orientation.

According to the present disclosure as described above, safety of an occupant of a wheelchair may be assured.

BRIEF DESCRIPTION OF THE DRAWINGS

Exemplary embodiments of the present disclosure will be described in detail based on the following figures, wherein.

DETAILED DESCRIPTION

Figure 1:
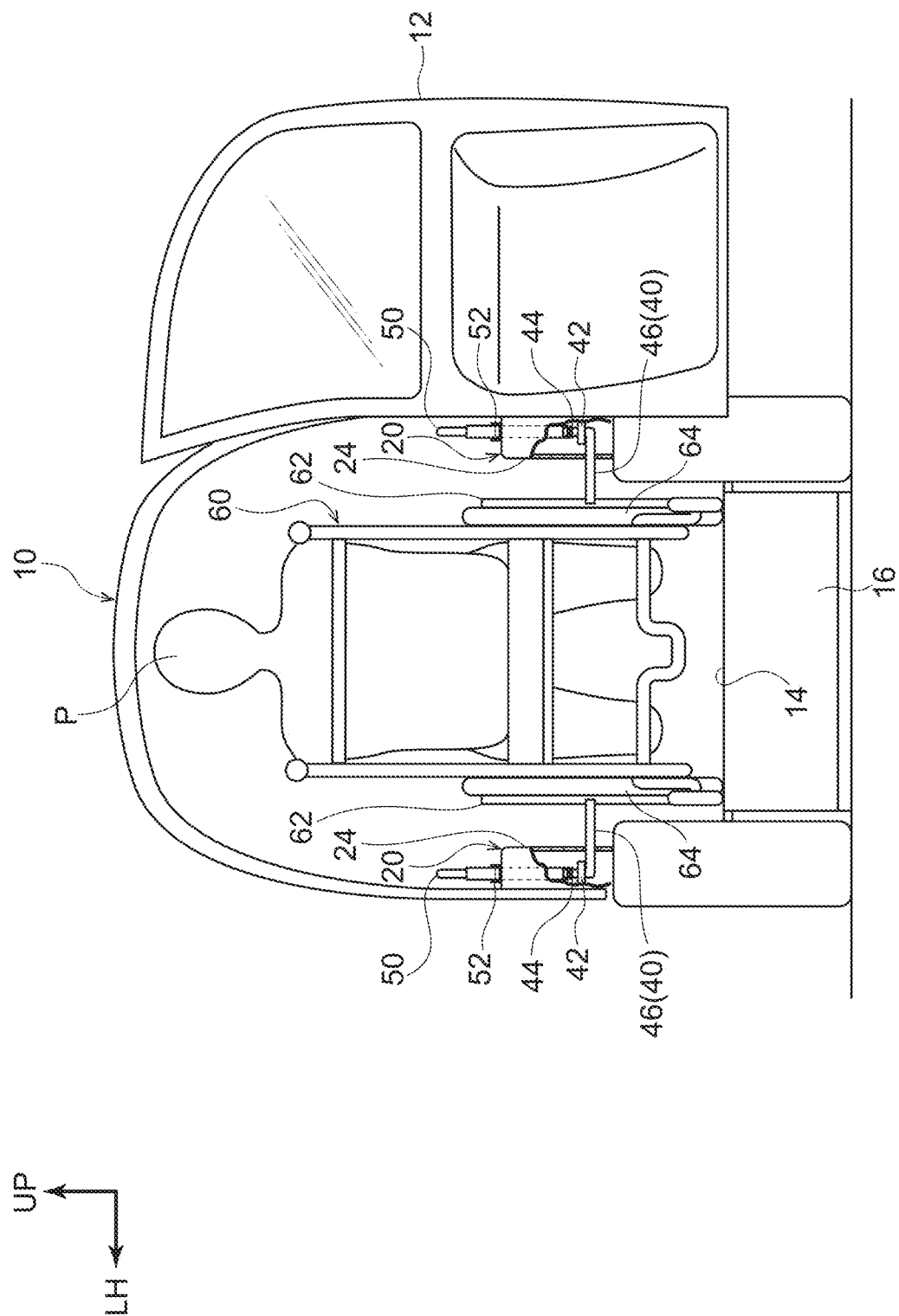
FIG. 1 is a rear view showing a vehicle according to a present exemplary embodiment in a state in which a back door is open.

Herebelow, an exemplary embodiment relating to the present disclosure is described in detail in accordance with the drawings. For convenience of description, the arrow UP that is shown where appropriate in the drawings indicates a vehicle body upper direction, the arrow FR indicates a vehicle body front direction, the arrow LH indicates a vehicle body left direction, and the arrow RH indicates the vehicle body right direction. In the following descriptions, where the directions up and down, front and rear, and left and right are recited without being particularly specified, the same represent up and down in the vehicle body vertical direction, front and rear in the vehicle body front-and-rear direction, and left and right in the vehicle body left-and-right direction (the vehicle width direction).

As shown in FIG. 1 to FIG. 4, a vehicle 10 according to the present exemplary embodiment is employed as a small car (a microvehicle) for a single occupant, which can be driven by an occupant P of a wheelchair 60. A back door 12 is provided at a rear portion of the vehicle 10. The back door 12 may, for example, be turned about a hinge portion at a right end portion side (vehicle width direction one end portion side) of the back door 12. Thus, the whole of the rear portion of the vehicle 10 may be opened up or closed by the back door 12.

A floor panel 14, which structures a floor of a vehicle cabin, is provided in the vehicle 10. A retractable, flat plate-shaped slope member 16 is provided at the lower side of a rear portion of the floor panel 14. That is, a storage space (not shown in the drawings) in which the slope member 16 can be stored is formed in a lower portion of the floor panel 14. The slope member 16 is structured to be movable in and out of the storage space manually or automatically.

Side panels 20 are provided at two side portions of the vehicle 10 (vehicle body). The side panels 20 serve as a left and right pair of panel members. At each side panel 20, front side securing members 30, a rear side securing member 40 and so forth, which are described below, are provided. The side panels 20 have similar structures with left-and-right symmetry. Accordingly, descriptions are mostly given only for the side panel 20 at one side (the left side).

Figure 5:
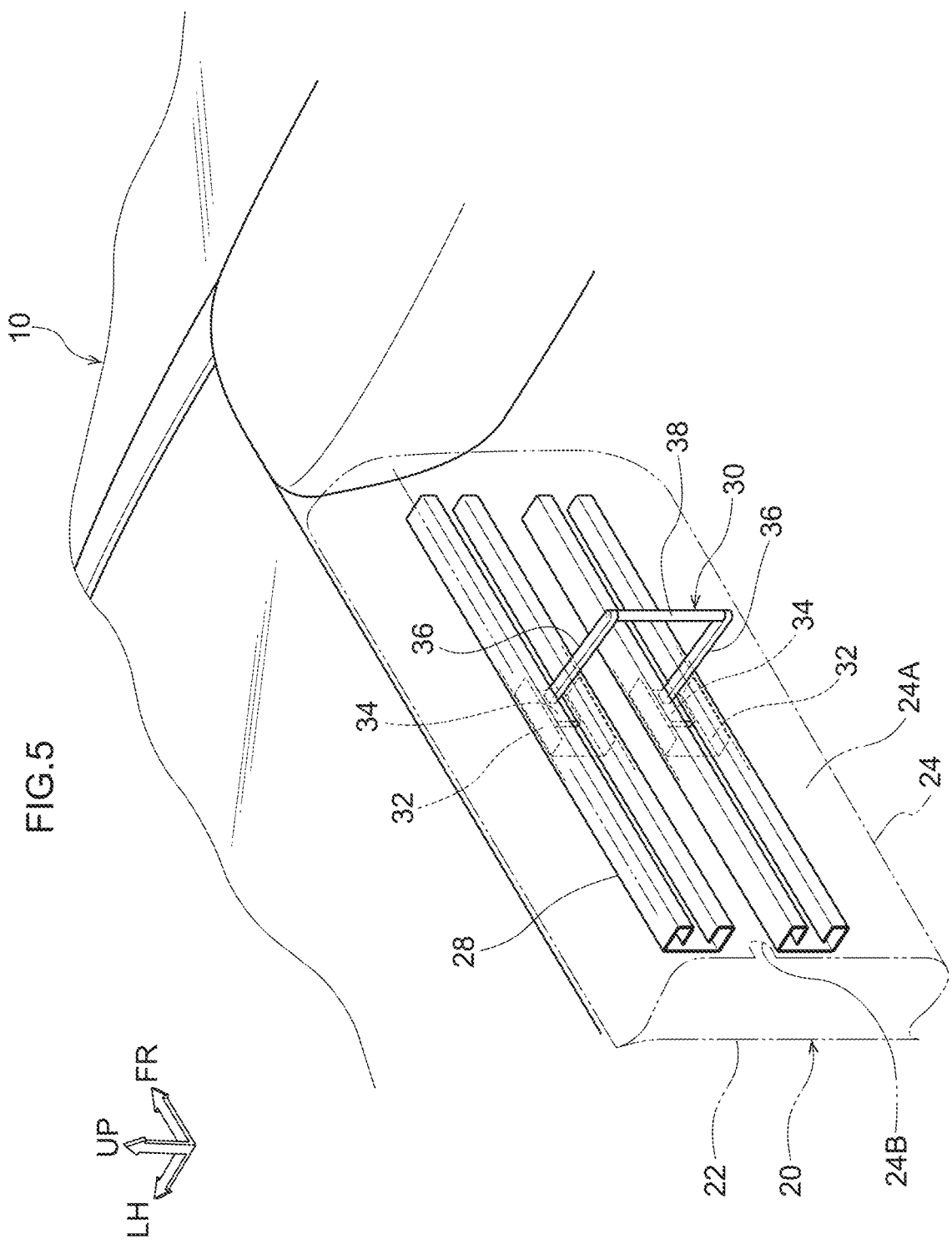
FIG. 5 is a perspective view showing front side securing members of the vehicle according to the present exemplary embodiment.

As is shown in more detail in FIG. 5, the side panel 20 is structured with a flat plate-shaped outer panel 22 and an inner panel 24 with a hat shape in cross section. An upper flange portion and a lower flange portion of the inner panel 24 are joined to an upper edge portion and a lower edge portion of the outer panel 22, forming a chamber. A wall portion 24A of the inner panel 24 that faces to the vehicle width direction inner side opposes the wheelchair 60 that is on board in the vehicle width direction.

An upper and lower pair of rail members 28 (formed as an upper and lower pair) are provided at an outer face side of the wall portion 24A of the inner panel 24 (i.e., inside the chamber). Each rail member 28 is formed in a substantial letter "C" shape in cross section, the open side of which is oriented to the vehicle width direction inner side, and extends in the front-and-rear direction. An opening portion 26 is formed in the wall portion 24A of the inner panel 24 opposing a vertical direction central portion of each rail member 28 in the vehicle width direction. The opening portion 26 is formed in a substantially oval shape that is narrow and long in the front-and-rear direction (see FIG. 2).

The front side securing members 30 are supported at the rail members 28 to be movable along the rail members 28 in the front-and-rear direction. To describe this more specifically, each front side securing member 30 includes a sliding portion 32 with a substantial letter "U" shape in cross section, a flat plate-shaped support portion 34 and a cylindrical (rod-shaped) main body portion 36. The sliding portion 32 is provided by being inserted into the rail member 28 in the front-and-rear direction. The support portion 34 is provided at a vertical direction central portion of the sliding portion 32. The main body portion 36 protrudes a predetermined length to the vehicle width direction inner side from a wall face of the support portion 34 that faces to the vehicle width direction inner side.

The sliding portion 32 and support portion 34 are disposed inside the rail member 28 (i.e., at the outer face side of the inner panel 24). The main body portion 36 protrudes to the vehicle width direction inner side (into the vehicle cabin) through the opening portion 26 (see FIG. 2). Vehicle width direction inner side end portions of the main body portions 36, which are an upper and lower set of two main body portions, are integrally connected by a cylindrical (rod-shaped) connecting portion 38, an axial direction of which is in the vertical direction.

Therefore, the occupant P of the wheelchair 60 may grip the connecting portion 38 and (by a manual operation) move the front side securing members 30 (the main body portions 36) along the upper and lower pair of rail members 28. In other words, the front side securing members 30 are structured to be movable along the rail members 28 that are an upper and lower pair by a manual operation by the occupant P of the wheelchair 60. Note that the connecting portion 38 is not shown in the drawings of FIG. 2 and FIG. 3.

A method of securing the front side securing members 30 relative to the rail members 28 is similar to a method of securing a vehicle seat to seat rails, which is not shown in the drawings. That is, the sliding portion 32 of each front side securing member 30 includes an engaging portion (not shown in the drawings) that can be detachably engaged with plural notch portions (not shown in the drawings) formed in the rail member 28, such that the sliding portion 32 may be secured at plural predetermined positions of the rail member 28. An operation portion such as a lever or the like (not shown in the drawings) is provided at the connecting portion 38 for switching the engaging portions between an engaged state and a disengaged state.

A front portion side of a handrim 62, which is fabricated of metal, of the wheelchair 60 that has boarded through the rear portion of the vehicle 10 abuts (touches) against outer periphery faces of the main body portions 36 that are provided as a set of two. That is, each main body portion 36 protrudes to a length that enables the handrim 62 of the wheelchair 60 to abut against the outer periphery face of a distal end portion of the main body portion 36 in a state in which the wheelchair 60 is in a driving position.

Figure 3:
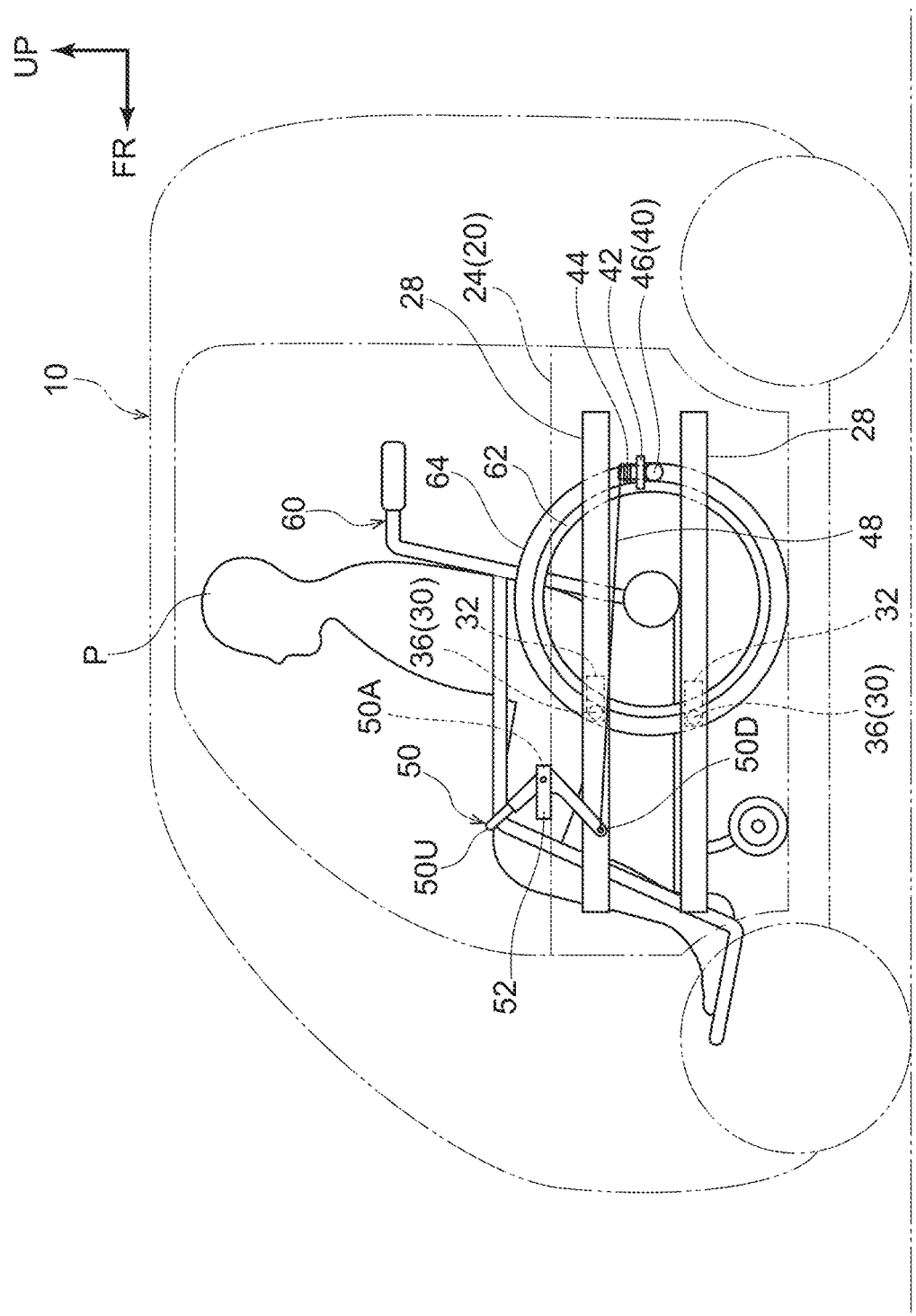
FIG. 3 is a side view showing the vehicle according to the present exemplary embodiment.

Viewed in the front-and-rear direction (which is a front-and-rear direction of the wheelchair 60), portions of the handrim 62 against which the main body portions 36 in the set of two respectively abut are portions that are separated by equal distances to the upper and lower sides relative to the center of the ring-shaped handrim 62 (sandwiching the center; see FIG. 3). Because these portions are the abutting portions, a position of the front side securing members 30 in the front-and-rear direction may be adjusted expeditiously in accordance with an outer diameter of the handrim 62.

Figure 4:
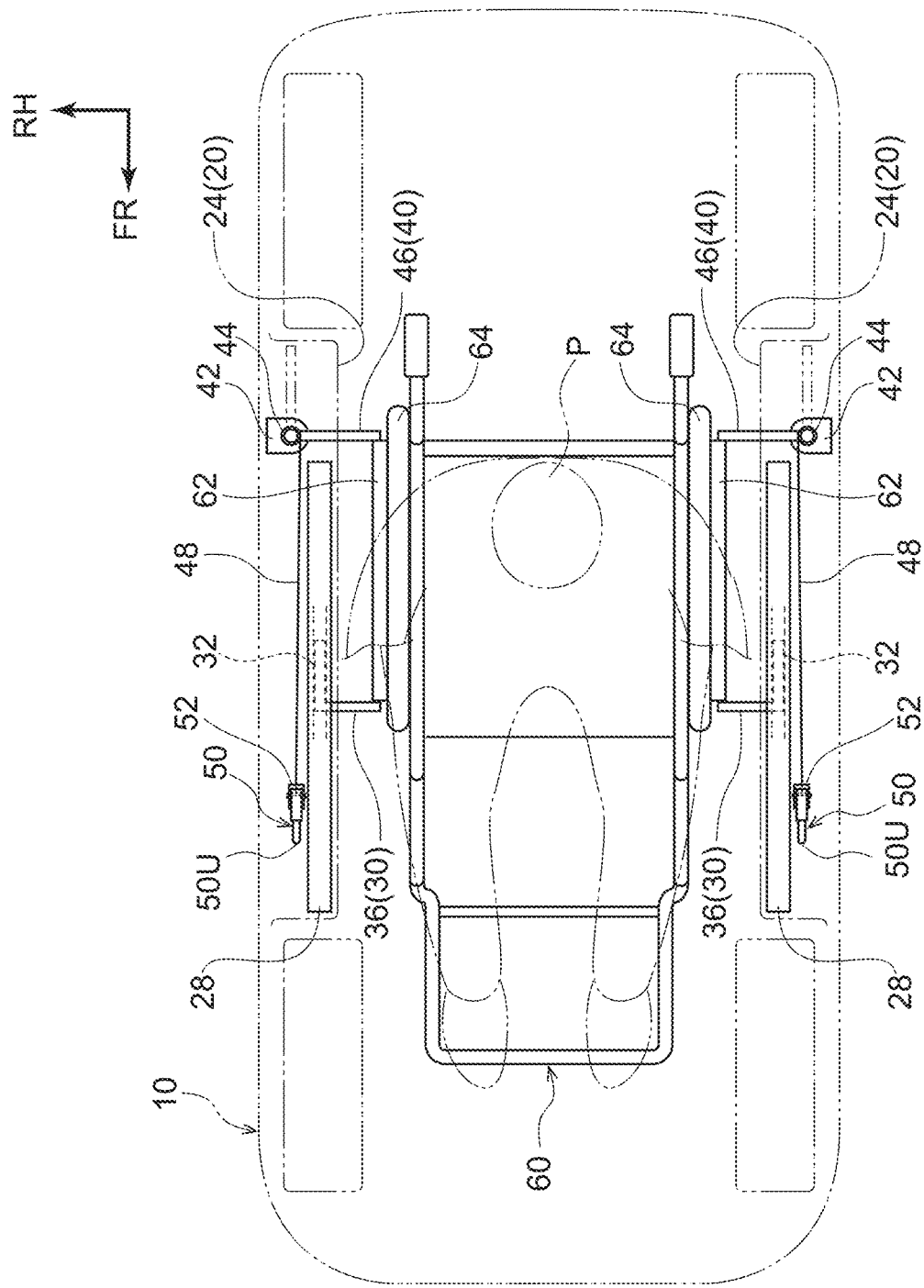
FIG. 4 is a plan view showing the vehicle according to the present exemplary embodiment.

As shown in FIG. 1, FIG. 3 and FIG. 4, the rear side securing member 40 is turnably provided inside the chamber of each side panel 20 of the vehicle 10. The rear side securing member 40 presses a rear portion side of the handrim 62 toward the front so as to push the front portion side of the handrim 62 against the outer periphery faces of the main body portions 36 of the front side securing members 30.

Figure 6:
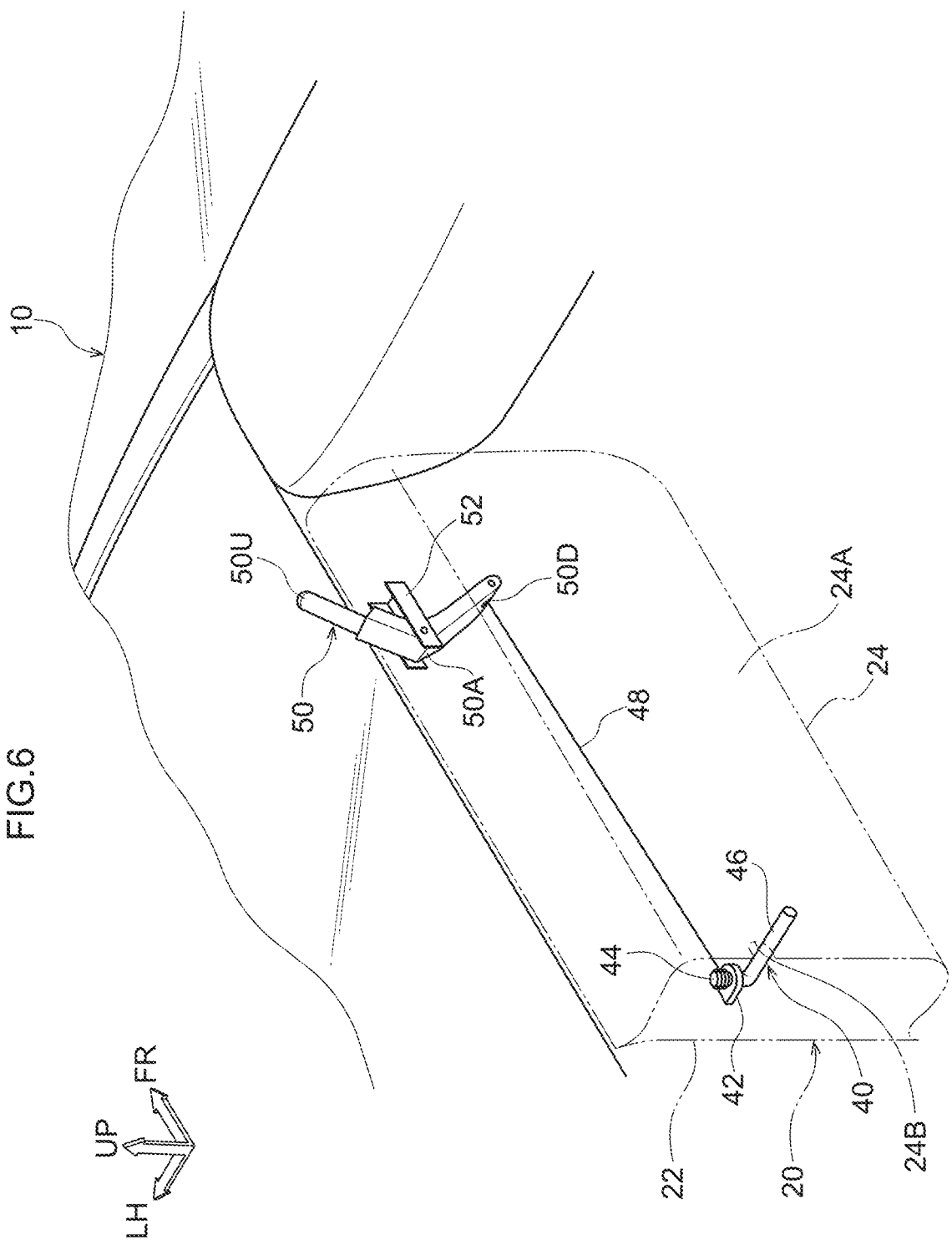
FIG. 6 is a perspective view showing a rear side securing member of the vehicle according to the present exemplary embodiment.

As is shown in detail in FIG. 6, the rear side securing member 40 includes a cylindrical bearing 44 and a cylindrical (rod-shaped) main body portion 46. The bearing 44 is turnable in both forward and reverse directions about an axial direction in the vertical direction. The main body portion 46 is bent in a right angle and integrally provided at a lower end portion of the bearing 44. That is, an axial direction of the main body portion 46 is oriented in a horizontal direction and the main body portion 46 is structured to be turnable about the bearing 44.

The main body portion 46 is formed with a length that, when the main body portion 46 is turned to substantially 90° toward the vehicle width direction inner side in plan view, enables an outer periphery face of a distal end portion thereof to abut against the rear portion side of the handrim 62. A long hole portion 24B in a substantially oval shape whose length direction is in the front-and-rear direction is formed in a rear end portion of the inner panel 24. The long hole portion 24B allows the main body portion 46 to turn (protrude) to the vehicle width direction inner side (in FIG. 5 and FIG. 6, only a portion of the long hole portion 24B is shown).

The bearing 44 is inserted into a penetrating hole (not shown in the drawings) in a flat plate-shaped bracket 42, which is integrally provided at an inner side face of the outer panel 22 (inside the chamber). The bearing 44 is supported at the bracket 42 to be turnable and not capable of dropping. The bearing 44 is continuously urged to the vehicle width direction outer side by an urging member such as a torsion spring (not shown in the drawings) or the like, such that the main body portion 46 is urged to be oriented to the vehicle rear side (such that the axial direction of the main body portion 46 is urged to be in the front-and-rear direction).

One end portion of a wire (cable) 48 is attached and wound in a predetermined direction round a portion of the bearing 44 that protrudes to the upper side beyond the bracket 42. Another end portion of the wire 48 is attached to a lower end portion 50D of a turning lever 50 that is structured with a ratchet mechanism. The wire 48 and the lower end portion 50D of the turning lever 50 are disposed inside the chamber of the side panel 20.

In a side view seen in the vehicle width direction, the turning lever 50 is formed in a substantial letter "L" shape. An inflected portion 50A of the turning lever 50 is oriented to the rear side. The inflected portion 50A is turnably supported inside a support mount 52 with an axial direction in the vehicle width direction. The support mount 52 is provided at an upper face of the inner panel 24 and has a substantial letter "U" shape in cross section. An upper portion 50U of the turning lever 50 is formed in a cylindrical shape (the upper portion 50U is a portion at the upper side relative to the inflected portion 50A and is below referred to as a grip portion). The upper portion 50U is disposed at a position at which the occupant P of the wheelchair 60 on board the vehicle 10 can grip the upper portion 50U with their hand.

Thus, a structure is formed in which, when the occupant P of the wheelchair 60 grips the upper portion 50U of the turning lever 50 with their hand and turns (moves) the upper portion 50U toward the rear side about the inflected portion 50A, the lower end portion 50D of the turning lever 50 turns (moves) toward the front side and pulls the wire 48 toward the front side.

When the wire 48 is pulled toward the front side, the bearing 44 round which the wire 48 is wound turns in opposition to the urging force of the urging member, and the main body portion 46 is turned substantially 90° toward the vehicle width direction inner side in plan view. Hence, the main body portion 46 of the rear side securing member 40 presses the rear portion side of the handrim 62 of the wheelchair 60 toward the front.

A turning angle (turning amount) of the turning lever 50 may be adjusted in a number of steps. That is, the turning lever 50 is structured with the ratchet mechanism, which can lock the turning angle at each step. Thus, a pulling amount (distance) of the wire 48 may be adjusted. Therefore, a pressing force with which the main body portion 46 of the rear side securing member 40 presses the rear portion side of the handrim 62 may be adjusted in accordance with the outer diameter of the handrim 62.

Thus, the rear side securing member 40 is structured as a mechanical structure that is capable of pressing the rear portion side of the handrim 62 toward the front with the main body portion 46 that is turned to the vehicle width direction inner side by a manual operation, which is the operation in which the occupant P of the wheelchair 60 turns (moves) the upper portion 50U of the turning lever 50 toward the rear side. A pressure force of the rear side securing member 40 may be adjusted by the ratchet mechanism that can be locked at a number of steps.

Figure 2:
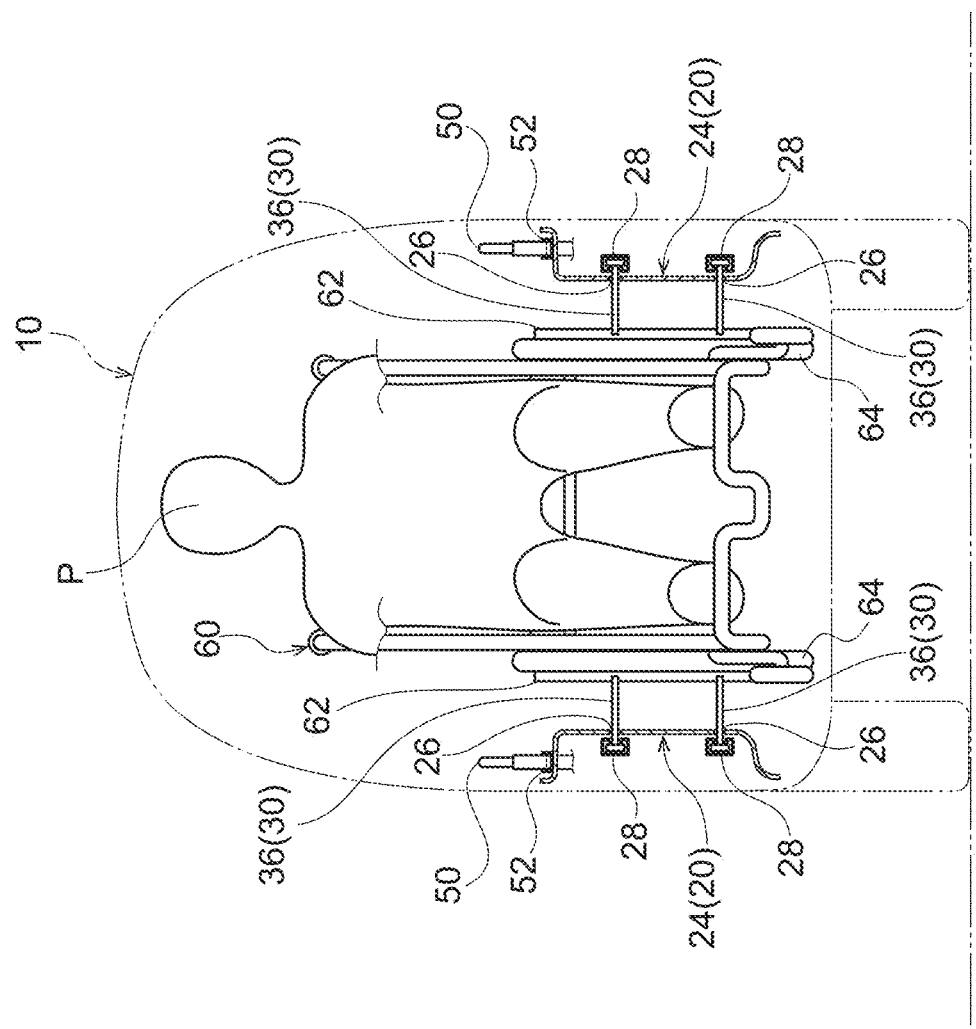
FIG. 2 is a front view showing the vehicle according to the present exemplary embodiment.

As shown in FIG. 1 and FIG. 2, seen in the front-and-rear direction (the front-and-rear direction of the wheelchair 60), the main body portion 46 of the rear side securing member 40 is provided between the main body portions 36 of the front side securing members 30 that are formed as a set of two (and is preferably provided at substantially the same height as the center of the handrim 62). That is, as shown in FIG. 3, in a side view seen in the vehicle width direction, the handrim 62 is sandwiched and secured by the main body portions 36 and the main body portion 46 that are disposed at the vertices of a substantial isosceles triangle whose altitude direction is in the front-and-rear direction.

Now, operation of the vehicle 10 according to the present exemplary embodiment that is structured as described above is described.

First, when an occupant P of the wheelchair 60 is boarding the vehicle 10, the back door 12 is turned and the rear portion of the vehicle 10 is opened up. The slope member 16 is pulled out from the storage space formed at the lower side of the floor panel 14 manually (an operation by a person other than the occupant P of the wheelchair 60) or automatically, and an end portion at the pulling-out direction side of the slope member 16 is rested on a road surface.

Hence, because the slope member 16 is disposed to be inclined at a predetermined angle relative to the road surface, the occupant P of the wheelchair 60 may easily move along an upper face of the slope member 16 to an upper face of the floor panel 14. That is, the occupant P of the wheelchair 60 may expeditiously board from the rear side of the vehicle 10 by using the slope member 16, and may move into the driving position without changing orientation.

The occupant P of the wheelchair 60 that has boarded the vehicle 10 causes the front portion side of each handrim 62 of the wheelchair 60 to abut (touch) against the main body portions 36 of the front side securing members 30 that are a set of two. At this time, because the front side securing members 30 are provided as a set of two at the upper and lower sides relative to the center of the handrim 62, the front portion side of the handrim 62 of the wheelchair 60 may be more effectively secured than in a structure in which only one of the front side securing members 30 is provided.

Here, a position in the front-and-rear direction of the front side securing members 30 (the main body portions 36) is adjusted in accordance with the outer diameter of the handrim 62 such that the wheelchair 60 itself is secured at a suitable position for when the occupant P of the wheelchair 60 is driving the vehicle 10. That is, the occupant P of the wheelchair 60 grips each connecting portion 38 with their hand and, while operating the operation portion (while keeping the engagement portions in the disengaged states thereof) moves the front side securing members 30 along the rail members 28. The occupant P releases the connecting portion 38 at the suitable position. Thus, each engaging portion is engaged with one of the plural notch portions formed in the rail member 28, and the front side securing members 30 are secured at the suitable position.

The front side securing members 30 are movably supported at the rail members 28, and the main body portions 36 that are provided as the set of two at the upper and lower sides relative to the center of the handrim 62 are integrally connected by the connecting portion 38. Therefore, by gripping the connecting portion 38, the occupant P of the wheelchair 60 may change the positions of the upper and lower pair of main body portions 36 (front side securing members 30) simultaneously.

In addition, as described above, the front side securing members 30 may be moved and then engaged and secured by a manual operation by the occupant P of the wheelchair 60 (the operation of the operation portion provided at the connecting portion 38). Therefore, the front side securing members 30 may be moved expeditiously by a simple structure. Thus, the wheelchair 60 may be positioned easily at a suitable position according to the outer diameter of the handrim 62 of the wheelchair 60.

When the front portion side of the handrim 62 of the wheelchair 60 is abutted (touched) against the main body portions 36 of the set of two front side securing members 30, the occupant P of the wheelchair 60 pulls the turning lever 50 (turns the upper portion 50U of the turning lever 50 toward the rear side). Accordingly, the wire 48 is pulled toward the front side, the main body portion 46 of the rear side securing member 40 turns toward the vehicle width direction inner side about the bearing 44 in opposition to the urging force of the urging member, and the main body portion 46 presses the rear portion side of the handrim 62 (a portion thereof at substantially the same height as the center of the handrim 62) toward the front.

Thus, the front portion side and rear portion side of the handrim 62 of the wheelchair 60 may be sandwiched in the front-and-rear direction and secured by the front side securing members 30 and the rear side securing member 40. Therefore, movement of the wheelchair 60 itself relative to the vehicle 10, due to inertial force when the vehicle 10 accelerates or decelerates or inertial force when the vehicle 10 is subject to a frontal collision or side collision, may be suppressed or prevented, and safety of the occupant P of the wheelchair 60 may be assured.

Needless to say, before the occupant P of the wheelchair 60 pulls the turning lever 50, the occupant P locks a wheel 64 of the wheelchair 60 with a brake (not shown in the drawings) provided at the wheelchair 60 and restrains their own body in the vehicle 10 with a seatbelt (not shown in the drawings) provided in the vehicle 10.

A pressure force when the main body portion 46 of the rear side securing member 40 presses the rear portion side of the handrim 62 toward the front is adjusted by a pressure force (turning amount) when the turning lever 50 is pulled. That is, because the turning lever 50 that causes the main body portion 46 of the rear side securing member 40 to turn is structured with a ratchet structure, the pulling amount (distance) of the wire 48 may be adjusted stepwise (in a number of steps). Therefore, the main body portion 46 of the rear side securing member 40 may press the rear portion side of the handrim 62 toward the front appropriately in accordance with the outer diameter of the handrim 62.

As described above, the rear side securing member 40 is structured as a mechanical structure such that the rear portion side of the handrim 62 is pressed toward the front by a manual operation by an occupant P of the wheelchair 60 (the operation of pulling the turning lever 50). Therefore, fabrication costs of the vehicle 10 may be reduced compared to, for example, a structure that is moved by an electric mechanism.

In a side view seen in the vehicle width direction, the handrim 62 is sandwiched and secured by the main body portions 36 and main body portion 46 arranged at the vertices of a substantial isosceles triangle whose altitude direction is the front-and-rear direction. Therefore, the wheelchair 60 may be more effectively and stably secured than in a structure in which the handrim 62 is sandwiched and secured at single points in the front-and-rear direction. Thus, movement of the wheelchair 60 itself relative to the vehicle 10 due to inertial force when the vehicle 10 accelerates, decelerates or the like may be more effectively suppressed or prevented.

The side panels 20 are arranged as a left and right pair, and the front side securing members 30 and the rear side securing member 40 are respectively provided in correspondence with each of the handrims 62 at left and right. Therefore, the wheelchair 60 may be more stably secured than in a structure in which the front side securing members 30 and the rear side securing member 40 are provided in correspondence with the wheelchair 60 at only one of left or right.

Because the rail members 28 that extend in the front-and-rear direction are provided at each side panel 20, stiffness of the side panel 20 may be improved, and the side panel 20 may withstand a side collision of the vehicle 10. That is, at the time of a side collision of the vehicle 10, a deformation amount of the side panel 20 to the vehicle width direction inner side may be reduced, and an injury criterion of the occupant P of the wheelchair 60 may be reduced.

Furthermore, because the rail members 28 are provided as an upper and lower pair, stiffness of the side panel 20 may be more effectively improved than in a structure in which only one of the rail member 28 is provided. Thus, the side panel 20 may more effectively withstand a side collision of the vehicle 10 (a deformation amount of the side panel 20 to the vehicle width direction inner side may be more effectively suppressed and an injury criterion of the occupant P of the wheelchair 60 may be more effectively reduced). Thus, even when there is a side collision of the vehicle 10, safety of the occupant P of the wheelchair 60 may be assured.

When the occupant P of the wheelchair 60 is exiting from the vehicle 10, the occupant P releases the ratchet mechanism and tilts the upper portion 50U of each turning lever 50 toward the front side. Accordingly, because the force pulling the wire 48 toward the front side is released, the main body portion 46 of the rear side securing member 40 is turned toward the vehicle width direction outer side by the urging force of the urging member.

As a result, securing of the wheelchair 60 (the handrim 62) by the front side securing members 30 and the rear side securing member 40 is released. Hence, the back door 12 is turned, the rear portion of the vehicle 10 is opened up, the slope member 16 is pulled out manually (an operation by a person other than the occupant P of the wheelchair 60) or automatically, and the occupant P of the slope member 16 may exit from the vehicle 10.

Hereabove, the vehicle 10 according to the present exemplary embodiment is described on the basis of the attached drawings, but the vehicle 10 according to the present exemplary embodiment is not limited to the vehicle shown in the drawings; designs may be modified as appropriate within a scope not departing from the spirit of the present disclosure. For example, rather than the handrim 62, the wheel 64 may be sandwiched in the front-and-rear direction and secured by the front side securing members 30 and the rear side securing member 40.

However, if the wheel 64 is secured, the wheel 64 resiliently deforms when pressed. Therefore, the possibility of the wheelchair 60 moving within a range of this resilient deformation cannot be eliminated. Accordingly, it is preferable if the handrim 62 that is fabricated of metal and does not resiliently deform when pressed is sandwiched in the front-and-rear direction and secured by the front side securing members 30 and the rear side securing member 40. Further, the front side securing members 30 may be structured to be moved by an electric mechanism in response to a switch operation by the occupant P of the wheelchair 60.

It is sufficient if the structure that turns the main body portion 46 of the rear side securing member 40 about the bearing 44 is a mechanical structure; the structure is not limited to the structure shown in the drawings. For example, although not shown in the drawings, a link mechanism is possible in which, when a lever member is tilted toward the front side, a rod member of which one end portion is attached to a lower end portion of the lever member slides to the rear side. The bearing 44 is provided at the other end portion side of the rod member, and turns such that the main body portion 46 turns to the vehicle width direction inner side. It is sufficient if this link mechanism is a structure in which a turning amount (pressure force) of the main body portion 46 of the rear side securing member 40 can be adjusted by a turning angle of the lever member (a movement amount of the rod member to the rear side).

The rear side securing members 40 may be provided at the floor panel 14 rather than at the side panels 20 (the inner panels 24). That is, the rear side securing members 40 may be formed as a structure in which (portions of) side portions at both left and right of a rear portion of the floor panel 14 rise up when the turning lever 50 is turned and press the rear portion sides of the handrims 62 toward the front side. A mode in which portions of the floor panel 14 rise up in this manner may be structured with an electric mechanism rather than a mechanical mechanism.

What is claimed is:

1. A vehicle, comprising:
    a panel member provided at a vehicle body, the panel member opposing a wheelchair, which has boarded the vehicle, in a vehicle width direction;
    a front side securing member provided at the panel member, the front side securing member being caused to contact a front portion side of a handrim of the wheelchair or a front portion side of a wheel of the wheelchair; and
    a rear side securing member that presses a rear portion side of the handrim or a rear portion side of the wheel toward a vehicle body front side so as to push the front portion side of the handrim or the front portion side of the wheel against the front side securing member.

2. The vehicle according to claim 1, wherein:
    a rail member that extends in a vehicle body front-rear direction is provided at the panel member, and
    the front side securing member is movably supported at the rail member.

3. The vehicle according to claim 2, wherein the front side securing member is configured to be movable by manual operation by an occupant of the wheelchair.

4. The vehicle according to claim 2, wherein:
the rail member comprises an upper and lower pair of rail members, and
in a view seen in the vehicle body front-rear direction, the front side securing member comprises a set of two front side securing members respectively provided at an upper side and a lower side relative to a center of the handrim or a center of the wheel.

5. The vehicle according to claim 4, wherein, seen in the vehicle body front-rear direction, the rear side fixing member is provided between the set of the two front side securing members.

6. The vehicle according to claim 1, wherein the rear side securing member is configured as a mechanical structure that may be caused to press the rear portion side of the handrim or the rear portion side of the wheel toward the vehicle body front side by a manual operation by an occupant of the wheelchair.

7. The vehicle according to claim 1, wherein:
the panel member comprises a pair of panel members respectively disposed at a left side and a right side, and
the front side securing member and the rear side securing member are provided so as to correspond to the handrim at each of the left side and the right side or the wheel at each of the left side and the right side.

8. The vehicle according to claim 1, further comprising a retractable slope member at a lower side of a rear portion of a floor panel, the slope member enabling the wheelchair to board the vehicle when a back door is open.

9. The vehicle according to claim 5, wherein the set of two front side securing members are integrally connected by a connecting portion.

* * * * *